Aug. 22, 1933.   K. R. HAGEN   1,923,306
VALVE FOR CORROSIVE FLUIDS
Filed Feb. 8, 1932
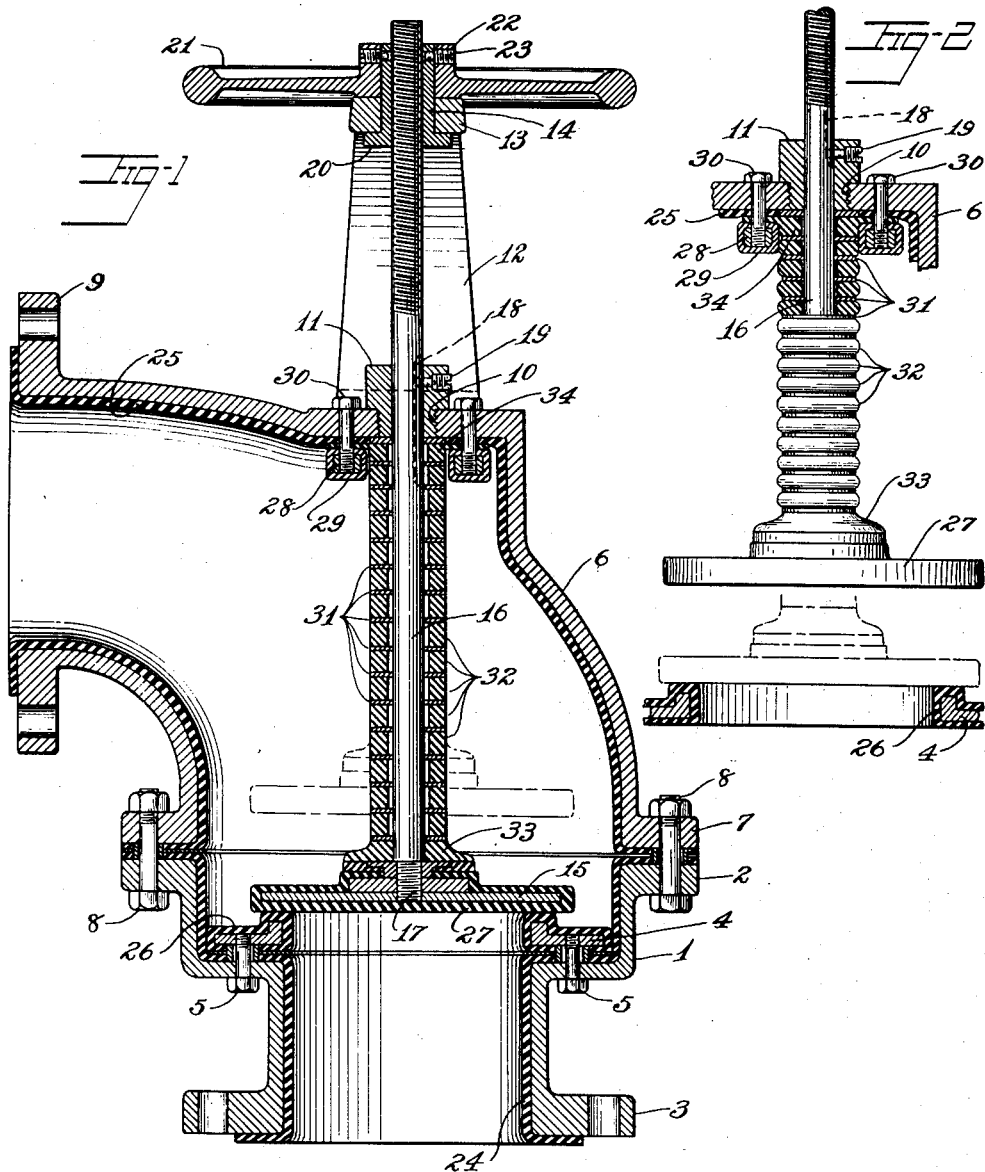
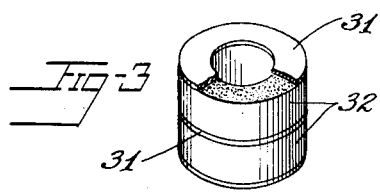
Inventor
Karl R. Hagen
By Eakin & Avery
Attys.

Patented Aug. 22, 1933

1,923,306

UNITED STATES PATENT OFFICE 1,923,306

VALVE FOR CORROSIVE FLUIDS

Karl R. Hagen, Akron, Ohio, assignor to The B. F. Goodrich Company, New York, N. Y., a Corporation of New York Application February 8, 1932. Serial No. 591,502

3 Claims. (Cl. 251—31)

This invention relates to valves for controlling the flow of corrosive fluids and corrosion-resistant operating mechanism therefor.

The principal objects of the invention are to provide a corrosion-resistant device in which the valve may be readily opened or closed by means extending from the exterior of the fluid conduit to the valve located therein without leakage of the fluid, and to provide for protecting the operating mechanism within the conduit from corrosion.

Further objects are to accomplish adjustment of the valve without introducing bending stresses in the corrosion resistant lining and without sliding of the corrosion resistant surfaces on each other.

Other objects will appear from the following description and the accompanying drawing.

In the drawing:

Fig. 1 is a cross-section of a valve structure showing the valve in closed position.

Fig. 2 is a detail fragmentary view of the same, only the valve, its stem, and guide mechanism, the valve seat, and their corrosion resistant coverings being shown, in open position, other parts of the valve structure being broken away, and Fig. 3 is a detail perspective view of the stem protecting washers, a part being broken away.

Referring to the drawing, the numeral 1 designates a rigid valve body provided with upper and lower flanges, 2 and 3 and a removable valve seat 4 held in place by bolts 5. A bonnet 6, also formed of rigid material, in the form of an elbow, is provided with a flange 7 rigidly secured to flange 2 by bolts 8, and with a flange 9 surrounding its outlet, for attachment to other pipe fittings.

The bonnet 6 is formed with a threaded opening 10 in its wall opposite and in line with the valve seat, in which an externally threaded smooth-bored bushing 11 is mounted. A V-shaped bracket 12 projects from the bonnet 6 so as to span the opening 10 and is bored in line therewith to provide an outboard bearing 13 in which an internally threaded externally smooth bushing 14 is rotatably journaled.

The valve disc 15 is supported by a valve stem 16 to which it is attached, as by cooperating threads 17. The stem 16 extends through bushings 11 and 14 and is threaded along its upper extremity to coact with bushing 14 and formed with a keyway 18 for such an extent as to permit the required endwise movement of the stem while engaging a key-screw 19 in bushing 11.

Bushing 14 is provided with a flange 20 on its lower end and a hand-wheel 21 is keyed thereto above the bearing 13, being engaged through its hub 22 and screws 23 passing therethrough and engaging bushing 14.

The body of the valve 1 is provided with a corrosion resistant lining 24 and the bonnet 6 is provided with a similar lining 25. These linings extend out over the flanged portions of these members.

The valve seat 4 is provided with a corrosion resistant lining 26 and the valve disc 15 is similarly provided with a facing 27.

Where the lining 25 of the bonnet 6 is apertured to admit the valve stem 16, a clamping ring 28 covered with a corrosion resistant lining 29 is provided to clamp the lining 25 around the aperture and is held in place by screws 30 passing through the walls of the bonnet.

In order to protect the valve stem from corrosion without leakage and at the same time permit raising of the valve from its seat, I provide a plurality of similar washers 31 of rigid corrosion resistant material such as hard rubber having central apertures adapted to slide on the stem 16, and, between adjacent rigid washers, I mount washers 32 of soft elastic corrosion-resistant material such as soft rubber, having central apertures preferably larger than those in the washers 31, the arrangement being such that as the valve disc 15 is raised from its seat the elastic washers 32 are laterally distorted, but are sustained in concentric relation to the stem by the rigid washers. The shortening of the distance between the valve disc 15 and guide bushing 11, occasioned by raising of the valve, will be equally distributed between the elastic washers, causing equal distortion in the washers.

The terminal elastic washers 33 and 34 are flanged to provide greater bearing surfaces on the abutting parts, washer 34 having its flange compressed under the clamping ring 28 and washer 33 overlapping the facing 27.

The condition of the elastic washers 32 when compressed is clearly shown in Fig. 2, the degree of compression being such that while the apertures in the washers 32 are reduced, they do not rub the surface of the valve stem.

When the valve is closed, the washers are under slight compression, sufficiently to securely seal the stem from the fluid conducted through the valve. This initial stress is made possible by the construction shown, in which the bonnet may be removed from the valve body and the valve disc screwed in place after the washers have been assembled on its stem, the threads 17 causing the washers to be compressed during assembling of the stem and disc.

While I have shown an angle valve for purposes of illustration, it is obvious that the invention may be applied to other types of valves.

I claim:

1. The combination in a valve of a corrosion-resistant valve body provided with a valve seat, a valve disc adapted to close the seat, a valve stem connected to said disc and extending through the wall of the valve body, means located outside the valve body and cooperating with said stem for moving the disc in relation to its seat, and corrosion resistant means for protecting the valve stem, said corrosion resistant means comprising a resilient tubular column of rubber washers surrounding the stem in contact with the conducted fluid.

2. The combination in a valve of a corrosion-resistant valve body provided with a valve seat, a valve disc adapted to close the seat, a valve stem connected to said disc and extending through the wall of the valve body, means located outside the valve body and cooperating with said stem for moving the disc in relation to its seat, and a corrosion resistant tubular column for protecting the valve stem, said column comprising permanently compressed resilient rubber washers in contact with the conducted fluid and surrounding the stem and, intercalated therewith, rigid means slidably engaging the stem for holding the resilient washers in spaced relation thereto.

3. The combination in a valve of a corrosion-resistant valve body provided with a valve seat, a valve disc adapted to close the seat, a valve stem connected to said disc and extending through the wall of the valve body, means located outside the valve body and cooperating with said stem for moving the disc in relation to its seat, and a corrosion resistant tubular column for protecting the valve stem, said column comprising resilient washers in contact with the conducted fluid and surrounding the stem but out of contact therewith when the valve is closed and, intercalated therewith, rigid washers slidably engaging the stem.

KARL R. HAGEN.